United States Patent [19]
Janik

[11] Patent Number: 5,560,434
[45] Date of Patent: Oct. 1, 1996

[54] CUTTING HOE AND METHOD

[76] Inventor: Donald A. Janik, 43 E. Daisy Ct., Queen Valley, Ariz. 85219

[21] Appl. No.: 402,648

[22] Filed: Mar. 13, 1995

[51] Int. Cl.⁶ .................................................. A01B 1/12
[52] U.S. Cl. .................................... 172/378; 172/380
[58] Field of Search ........................... 172/371, 375, 172/378, 379, 380, 381, 382

[56] References Cited

U.S. PATENT DOCUMENTS

| | | | |
|---|---|---|---|
| 791,623 | 6/1905 | Holmes | 172/380 |
| 800,872 | 10/1905 | Newcomb | 172/378 |
| 1,239,316 | 9/1917 | Svendsen | 172/380 X |
| 1,679,806 | 8/1928 | Bockstadter | 172/381 |
| 2,528,576 | 11/1950 | Brown | 172/380 X |
| 2,672,804 | 3/1954 | Kralovetz et al. | 172/378 X |
| 3,000,451 | 9/1961 | Adams | 172/381 X |
| 4,779,685 | 10/1988 | Combs | 172/380 |
| 5,097,910 | 3/1992 | Traczek | 172/378 X |

*Primary Examiner*—Terry Lee Melius
*Assistant Examiner*—Robert Pezzuto
*Attorney, Agent, or Firm*—Harry M. Weiss; Jeffrey D. Moy; Harry M. Weiss & Associates

[57] ABSTRACT

A cutting hoe and method wherein a handle is connected to a cutting head that has a cutting surface along a substantially 360 degree cutting portion circumscribing the cutting head thereby permitting cutting in any direction. In one embodiment, a star configuration is provided for the cutting head which is, for example, a four pointed star-shaped configuration. In other embodiments substantially circular and rectangular (i.e. square) shaped cutting head configurations are disclosed.

10 Claims, 1 Drawing Sheet

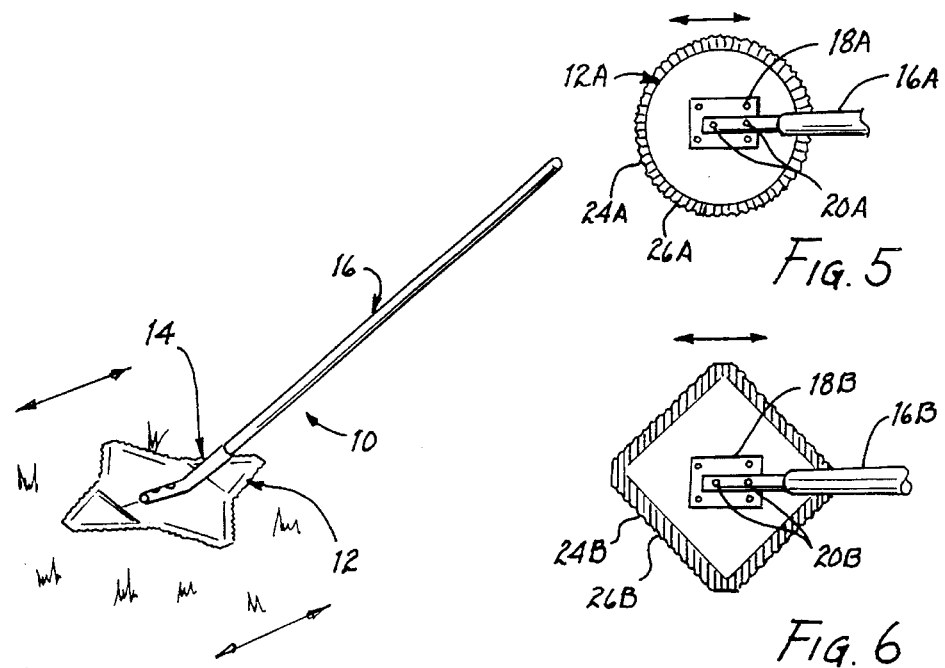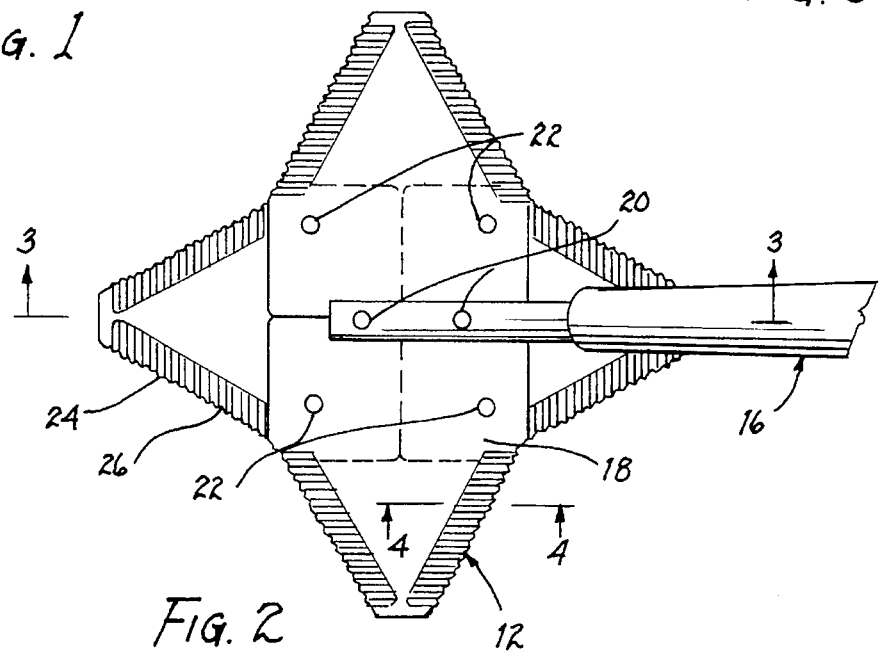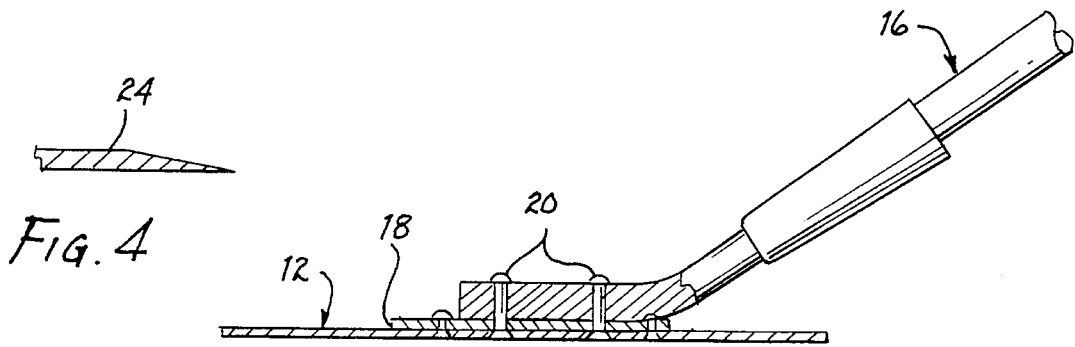

CUTTING HOE AND METHOD

BACKGROUND OF THE INVENTION

1. Field of Invention

This invention relates generally to an improved cutting hoe and method and, more specifically, to an improved cutting hoe and method for cutting weeds, grass, and other types of growth or vegetation.

2. Description of the Prior Art

Some prior cutting implements previously developed became widely used such as the "Weed Eater" which was generally a gasoline operated small motor device that was used to rapidly rotate at high speed a cord that served like a scythe to cut down all kinds of growth or vegetation. However, this type of cutting implement is fairly expensive and is somewhat dangerous to use because of creating propulsion of small stones at high speed that could hurt someone or cause damage.

Simpler, less expensive hoes and other cutting implements for yards or lots have been used to assist in the process of clearing a yard or field from weeds, grass and other types of growth or vegetation. That clearing process may be in connection with general cleaning and/or beautification of a yard or field, and may also be in connection with planting activities. Hoes and other cutting implements for yards, lots or fields are typically designed to be used manually.

In the past, hoes and other similar type cutting implements (i.e. scythes, etc.) were fabricated normally with one or, occasionally, two straight or sometimes curved cutting surfaces. As a result, such hoes and cutting implements required a significant amount of effort on the part of the user to operate, and could only be used in a linear or straight, back and forth motion to permit one (or, if provided) two cutting surfaces to provide the desired cutting operation. Moreover, for the best cutting results, the prior art hoes and similar type cutting implements required frequent sharpening of the cutting surfaces with only limited amounts of sharpening operations before the metal cutting blade became unusable. The limitations (of directional use, cutting blade configurations, and limited sharpening operations) inherent in the design of the prior art hoes and cutting implements together reduced their use, efficiency and desirability.

A need therefore existed to provide an improved and more efficient and desirable cutting hoe. Specifically, a need existed to provide an improved cutting hoe that could be used with less cutting effort, in multiple directions, that was more durable, and that would have a configuration that permitted more sharpening operations and improved cutting surfaces over a 360 degree surface cutting area.

SUMMARY OF THE INVENTION

It is an object of this invention to provide an improved cutting hoe and method.

It is another object of this invention to provide an improved cutting hoe and method that will be more versatile and sturdy and that will last longer because it will permit extended operational life over multiple sharpening operations.

It is a still further object of this invention to provide an improved cutting hoe and method which permits a cutting operation in multiple directions.

It is a still another object of this invention to provide an improved cutting hoe and method which will have elongated uniquely shaped teeth that can be repeatedly resharpened and still provide very sharp cutting surfaces despite loss of metal material during sharpening operations.

It is a still further object of this invention to provide an improved cutting hoe and method for cutting down undesirable grass, weeds and other growth or vegetation.

BRIEF DESCRIPTION OF THE DRAWINGS

FIG. 1 is a perspective view of a cutting hoe apparatus with a four point star-shaped cutting head.

FIG. 2 is an enlarged top view of the star-shaped cutting head and a portion of the connecting handle of the cutting hoe apparatus of FIG. 1.

FIG. 3 is a right side elevational view of the cutting hoe apparatus of FIG. 1, with the left side elevational view being a mirror image thereof.

FIG. 4 is a side elevational view taken along the line 4—4 of a single cutting member or element showing its tapered cutting edge.

FIG. 5 is a view similar to FIG. 2 showing another embodiment of this invention wherein the cutting head of the cutting hoe apparatus is round.

FIG. 6 is a view similar to FIG. 2 showing another embodiment of this invention wherein the cutting head of the cutting hoe apparatus has a rectangular configuration (i.e. is square).

BRIEF DESCRIPTION OF THE PREFERRED EMBODIMENT

In accordance with one embodiment of this invention, a cutting hoe useful for removing undesirable grass, weeds and other types of growth is disclosed which comprises, in combination, a handle, and cutting head means coupled to a portion of the handle and having a cutting surface along a substantially 360 degree cutting portion circumscribing the cutting head means for permitting cutting in any direction.

In accordance with another embodiment of this inventions, a method is disclosed for using a hoe for removing undesirable grass, weeds and other types of growth which comprises the steps of providing a handle, and providing cutting head means coupled to a portion of the handle and having a cutting surface along a substantially 360 degree portion circumscribing the cutting head means for permitting cutting in any direction.

The foregoing and other objects, features and advantages of this invention will be apparent from the following more particular description of the preferred embodiments of the invention as illustrated in the accompanying drawings.

Referring to the embodiment of FIG. 1, reference numeral 10 refers generally to the cutting hoe of this invention. The cutting hoe 10 is shown, in this embodiment, as containing a star-shaped (i.e. a four pointed star-shaped configuration as shown in FIGS. 1 and 2) cutting head 12 attached using a connecting member 14 to a handle 16. Preferably, the handle 16 is made of wood or plastic and cutting head 12 and the connecting member 14 are made of metal.

Referring to FIG. 2, a top view of the cutting hoe 10 of FIG. 1 is shown. FIG. 2 shows a (end) portion of the handle 16 coupled to a (preferably metal) plate 18 (using the connecting member 14) and also to the star-shaped cutting head 12 by connecting means (or welds) 20 wherein the star shaped cutting means comprises four pointed portions and a configuration having two angles sides with each of the two angled sides forming an obtuse angle greater than 100 degrees at an intersection of one of the two angled sides of an adjacent portion. Smaller connecting means (or welds) 22 connect the plate 18 to the star-shaped cutting head 12. Sharpened teeth 24 are provided as a substantially 360 degree cutting portion around the perimeter of the star-shaped cutting head 12 and are formed by means of its tapered configuration (see FIG. 4) and slanted pointed teeth (see FIG. 2) to provide a serrated cutting edge portion 26.

Referring to FIG. 3, a right side elevational view of the cutting hoe 10 is shown. FIG. 3 shows the handle 16, which is coupled to the plate 18 and the star-shaped cutting head 12 by means of the connecting means (or welds) 20, which pass through the connecting member 14 (see FIG. 1), the plate 18, and the star-shaped cutting head 12. Preferably, the handle 16 forms a 35 degree angle with the cutting head 12 for optimum cutting (or hoe swinging) operation.

Referring to FIG. 4, a side view is shown taken along line 4—4 of FIG. 2 of the cutting hoe 10 of FIG. 2. FIG. 4 shows one of the sharpened teeth 24 that are located (as one of a plurality of connected together teeth 24) around a perimeter portion of the star-shaped cutting head 12 (see FIG. 2).

Referring to FIG. 5, a view similar to FIG. 2 is shown of another embodiment of this invention wherein the same reference numbers are used as in FIG. 2 with the addition of the letter A to connote a different embodiment. FIG. 5 shows a handle 16A coupled to a plate 18A and to a substantially round cutting head 12A by connecting means 20A. Connecting means or welds similar to the welds 22 of FIG. 2 connect the plate 18A to the substantially round cutting head 12A. Sharpened teeth 24A (similar to the sharpened teeth 24 of FIG. 2) are formed on a perimeter portion of the round cutting head 12A and thereby provide a serrated cutting surface.

Referring to FIG. 6, a view similar to FIG. 2 is shown of still another embodiment of this invention wherein the same reference numbers are used as in FIG. 2 with the addition of the letter B to connote this different embodiment. FIG. 6 shows a handle 16B coupled to a plate 18B and to a substantially rectangular (in this example a square shaped) cutting head by connecting means or welds 20B. Smaller connecting means or welds (like 22 of FIG. 2) connect the plate 18B to the square shaped cutting head. Sharpened teeth 24B are formed around the perimeter of the square shaped cutting head and provide a serrated cutting portion 26B.

While the invention has been particularly shown and described with reference to preferred embodiments thereof, it will be understood by those skilled in the art that the foregoing and other changes in form and details may be made therein without departing from the spirit and scope of the invention. For example, hardened steel is preferably used wherever metal members are used. The rivets 22 are preferably 0.25 inch rivets. The connecting member 14 (see FIG. 1) is preferably made of a portion (about 6 inches long) of about 0.5 inch diameter steel rod tubing bent to provide the preferred 35 degree angle (about two inches from the end) (see FIG. 3). Preferably, the wood handle 16 is about five feet long and is preferably cemented into an opening in the steel rod 14.

The hoe 10 of this invention is especially useful in cutting thick weed stems and the sharp, serrated cutting portion 26 is especially useful in cutting (and or sawing or hacking) operations. The serrated cutting portion 26 is continuously provided during cutting use and the sharpening of the teeth 24 (even though metal removal occurs during the sharpening of these teeth 24) provides an extended life time for this serrated cutting surface portion 26 due to both the tapered and slanted configuration of each of the teeth 24. Therefore, even after much use and wear, the serrations continue to be provided after sharpening of the teeth 24 due to the length of each of the teeth 24 (from where they begin to be slanted and tapered) around the perimeter of each cutting head 12. Even weeds located in gravel, decomposed granite or stony dirt landscaping areas can easily be cut with the hoe 10 of this invention without damage thereto because of the construction and configuration thereof. The thin profile of the cutting head 12 (and corresponding relatively light weight) permits low shearing or cutting of weeds (almost at ground level). The cutting hoe 10 of this invention is flexible in its cutting operation to enable cutting in any direction even using a push-pull type cutting operation.

Furthermore, if desired, a diamond shaped configuration (rather than the square, star-shaped or circular cutting head configurations (depicted in the figures), can be used. Additionally, sharpened edges rather than serrated or teeth type edges can be used.

I claim:

1. A cutting hoe especially useful for cutting grass, weeds and undesired types of growth comprising, in combination:

a handle; and cutting head means coupled to a portion of said handle and having a cutting surface along a substantially 360 degree cutting portion circumscribing said cutting head means for permitting cutting in any direction within a cutting plane of said cutting hoe, said cutting head means comprises a substantially star-shaped cutting head configuration, said substantially star-shaped cutting head configuration comprises a four pointed star-shaped cutting head configuration, each pointed portion of said four pointed star-shaped cutting head configuration having two angled sides with each of said two angled sides forming an obtuse angle greater than 100 degrees at an intersection of an adjacent one of two angled sides of an adjacent pointed portion of said four pointed star-shaped cutting head configuration, said four pointed star-shaped cutting head configuration having a center portion centrally located with respect to all four pointed portions of said four pointed star-shaped cutting head configuration and extending to the intersections of all pointed portions, said center portion having a thickness greater than a thickness of each pointed portion, said center portion having a length and width which are both longer than a height of each pointed portion extending from outside said center portion.

2. A cutting hoe in accordance with claim 1 wherein a connecting plate is provided between said portion of said handle and said cutting head means, said plate having connecting means for connecting said cutting head means to said portion of said handle.

3. A cutting hoe in accordance with claim 2 wherein said connecting means comprising a plurality of welds, said cutting head means comprising a metal material and said connecting plate comprising a metal material.

4. A cutting hoe in accordance with claim 1 wherein said substantially 360 degree cutting portion circumscribing said cutting head means comprising a cutting edge portion having a plurality of tapered teeth.

5. A cutting hoe in accordance with claim 4 wherein said plurality of tapered teeth being connected together, said connected together plurality of tapered teeth having a continuous serrated cutting surface circumscribing said substantially 360 degree cutting portion of said cutting head means.

6. A method for using a cutting hoe especially useful for cutting, grass, weeds and undesired types of growth comprising the steps of:

providing a handle; and providing a cutting head means coupled to a portion of said handle and having a cutting surface along a substantially 360 degree cutting portion circumscribing said cutting head means for permitting cutting in any direction within a cutting plane of said cutting hoe, said cutting head means comprises a substantially star-shaped cutting head configuration, said substantially star-shaped cutting head configuration comprises a four pointed star-shaped cutting head configuration, each pointed portion of said four pointed star-shaped cutting head configuration having two angle sides with each of said two angled sides forming an obtuse angle greater than 100 degrees at an intersection of an adjacent one of two angled sides of an adjacent pointed portion of said four pointed star-shaped cutting head configuration, said four pointed star-shaped cutting head configuration having a center portion centrally located with respect to all four pointed portions of said four pointed star-shaped cutting head configuration and extending to the intersections of all pointed portions, said center portion having a thickness greater than a thickness of each pointed portion, said center portion having a length and width which are both longer than a height of each pointed portion extending from outside said center portion.

7. The method in accordance with claim 6 including the step of providing a connecting plate between said handle and said cutting head means, said plate having connecting means for connecting said cutting head means to said handle.

8. The method in accordance with claim 7 wherein said connecting means comprising a plurality of welds, said cutting head means comprising a metal material and said connecting plate comprising a metal material.

9. The method in accordance with claim 6 wherein said substantially 360 degree cutting portion circumscribing said cutting head means comprising a cutting edge portion having a plurality of tapered teeth.

10. The method in accordance with claim 9 wherein said plurality of tapered teeth being connected together, said connected together plurality of tapered teeth having a continuous serrated cutting surface circumscribing said substantially 360 degree cutting portion of said cutting head means.

* * * * *